May 24, 1932. J. H. NORTHROP 1,859,458
MACHINE FOR SHREDDING DATE FRUIT
Filed April 15, 1931 2 Sheets-Sheet 1
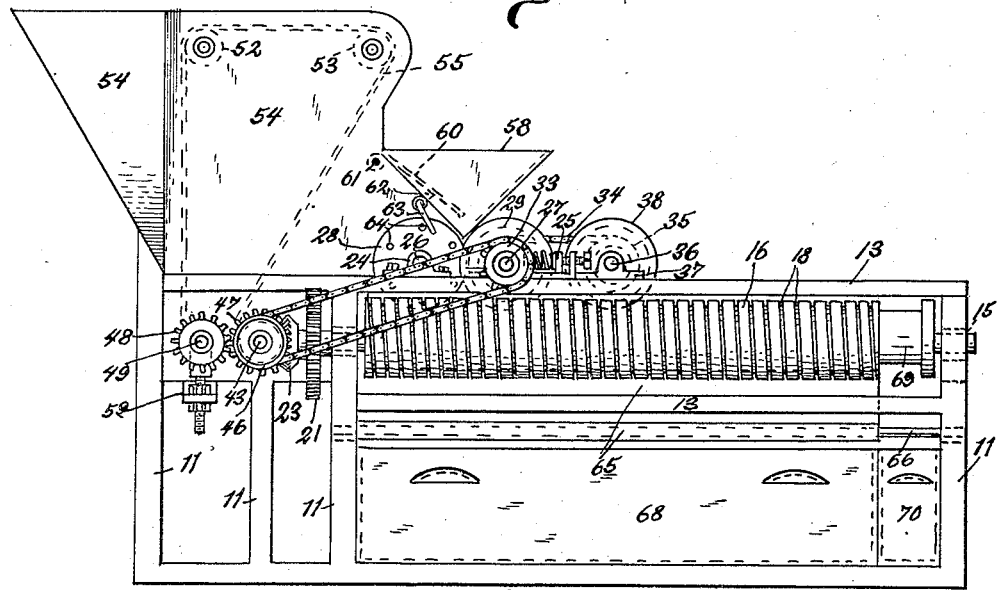
Fig. 1.
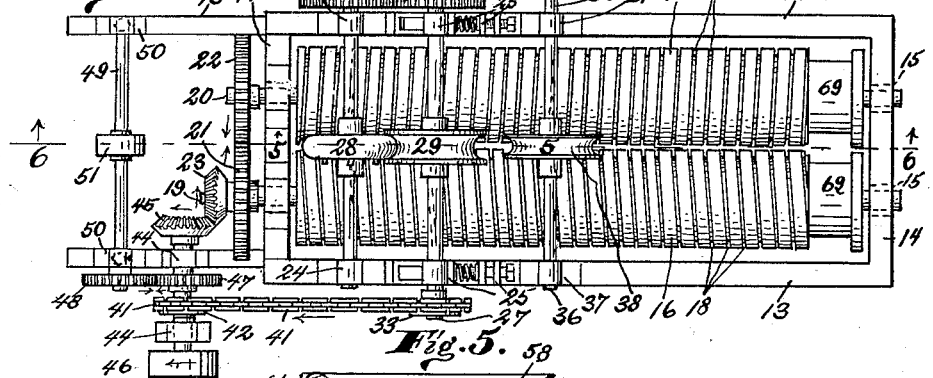
Fig. 2.
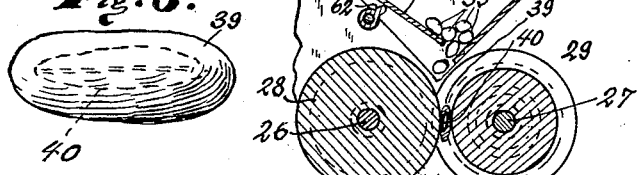
Fig. 5.
Fig. 3.
Fig. 4.
Inventor.
James H. Northrop.
By
Lockwood & Lockwood,
His Attorneys.

May 24, 1932. J. H. NORTHROP 1,859,458
MACHINE FOR SHREDDING DATE FRUIT
Filed April 15, 1931 2 Sheets-Sheet 2
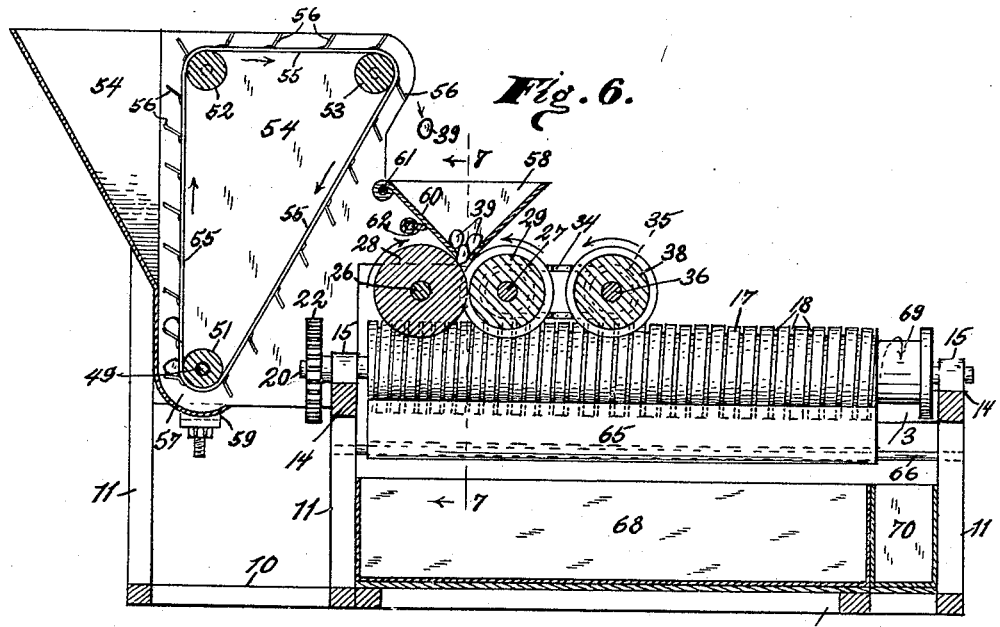
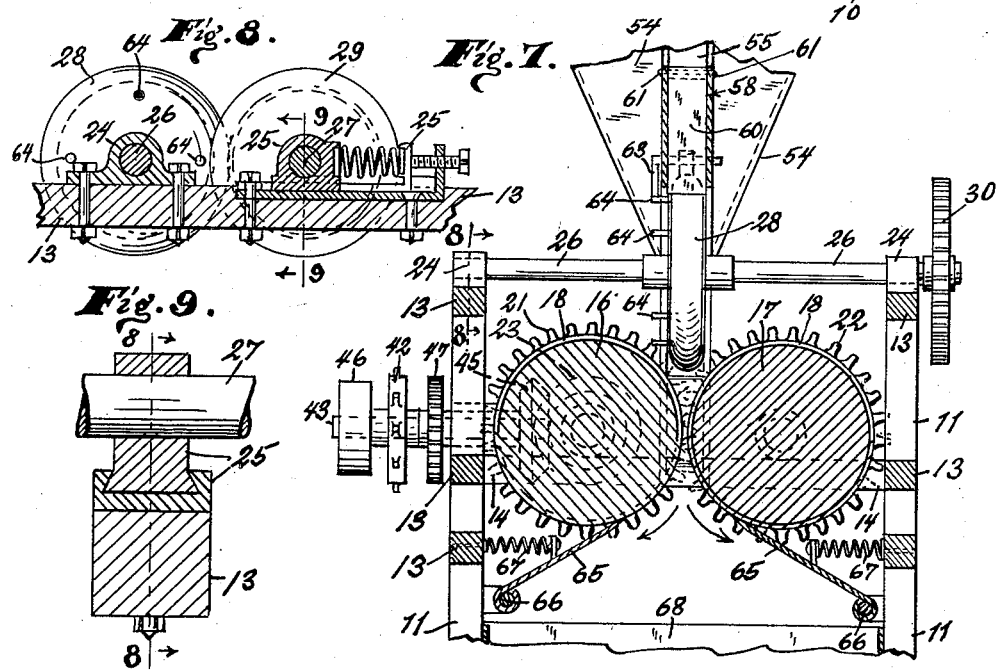
Inventor.
James H. Northrop.
By
Lockwood & Lockwood,
His Attorneys.

Patented May 24, 1932

1,859,458

UNITED STATES PATENT OFFICE

JAMES H. NORTHROP, OF SANTA ANA, CALIFORNIA

MACHINE FOR SHREDDING DATE FRUIT

Application filed April 15, 1931. Serial No. 530,306.

This invention relates to a machine for shredding date fruit so it can be molded into suitable forms for handling, shipping and eating; and it is an improvement of my date shredder patented June 14, 1919, No. 1,307,692; and the principal object of this improvement is to provide a simple and efficient means for crushing and feeding the dates to the shredder rollers so the latter can begin stripping the fruit from the date seeds the moment the dates contact with the rollers.

Heretofore the dates had a tendency to ride above and in rolling contact with the shredder rollers so that the fruit was not stripped from the seeds for some time after it engaged the rollers, with the result that it often reached the discharge end of the rollers with some of the fruit still remaining on the seeds; and, as previously indicated, an object of the invention is to remove substantially all of the fruit from the date seeds before they are discharged from the rollers, which is accomplished by first crushing the dates so they are relatively flat or in a form in which they can not roll or ride on the shredder rollers but will at once be carried down between them so that all of the fruit is removed from the seeds before the latter are discharged from the rollers.

Another object of the invention is to increase the capacity of the machine without increasing its size, which is accomplished by improving the means for feeding the dates to and along the shredder rollers. In other words, the feeding means includes a pair of crushing rollers arranged above the shredding rollers with one of the crushing rollers arranged to start the crushed dates in a movement toward the discharged ends of the shredder rollers, with also another feed roller arranged to continue the travel of the dates toward the discharged end of the rollers.

A feature of invention is shown in the mounting of the crusher rollers whereby they crush and feed the dates directly to the shredder rollers, with one of them arranged to yield to compensate for larger or smaller sized date seeds.

Other objects, advantages and features of invention may appear from the accompanying drawings, the subjoined detailed description and the appended claims.

The accompanying drawings illustrate the invention.

Figure 1 is a side view of a machine for shredding date fruit that is constructed in accordance with this invention.

Fig. 2 is a plan view of the machine with the conveyor and hoppers removed to more clearly show the arrangement of the crusher, feed and shredder rollers and means for driving them.

Fig. 3 is a side view of a ripe date shown about actual size and the seed shown by dotted lines.

Fig. 4 is a side view of the date seed after the fruit has been removed.

Fig. 5 is a fragmental enlarged section on line 5—5, Fig. 2, parts omitted; diagrammatically indicating a date flattened out between the crusher rollers.

Fig. 6 is a central longitudinal section on line 6—6, Fig. 2.

Fig. 7 is an enlarged cross section on line 7—7, Fig. 6, showing the means for stripping the sticky date fruit from the shredder rollers.

Fig. 8 is a fragmental section on lines 8—8, Figs. 7 and 9, showing means for mounting the crusher rollers so that one can yield when necessary.

Fig. 9 is a fragmental cross section on line 9—9, Fig. 8, showing the fixed and yielding member in the mounting of the yielding crusher roller.

The machine includes a frame having sills 10, and vertical supports 11 to which the longitudinal and cross beams 13 and 14 are secured, which parts are arranged to support the mechanism of the machine.

Secured to the cross beams 14 are bearings 15, in which the reduced ends of the shredder rollers 16 and 17 are mounted with the rollers arranged so that their peripheral surfaces are nearly engaged and each roller is provided with a helical groove 18 that extends from end to end thereof and arranged so that when the rollers are rotated in the direction of the arrows in Fig. 7, the edges of the grooves will extend to carry the dates from the feed toward the discharge ends of the rollers.

The rollers 16 and 17 are a sufficient width apart to form a passage for the fruit or pulp of the dates, but not so the date seeds can pass through. In other words, the space between the rollers is less than the cross diameter through the smallest date seed.

At the feed end of these rollers their reduced ends or spindles 19 and 20 are extended beyond the bearings 15 and are provided with gears 21, 22 that mesh so that when the bevel gear 23 on the spindle 19 is driven these shredder rollers will be actuated.

Mounted on the top beams 13 are the fixed bearings 24 and yielding bearings 25 in which the shafts 26 and 27 of the crusher rollers 28 and 29 are mounted; and these parts are arranged so the crusher rollers are supported slightly above the shredder rollers and close to the peripheral angle between them; or directly over the passage between the rollers 16, 17 through which the date fruit is forced as it is removed from the seeds.

The roller 28 is formed with a convex peripheral surface that extends into an annular concave groove in the periphery of the wheel 29 so that when the dates are fed in between these rollers they are crushed into trough-like forms that aids greatly in separating the fruit from the seeds.

The shaft of the roller 29 is mounted in the yielding bearings 25 so that the roller can yield to compensate for seeds of different size. The purpose of this mounting is to avoid crushing the seeds, as otherwise the small broken particles would pass into the fruit and make it less desirable as a food, as the date seeds are very hard and broken particles passing into the fruit would obviously injure a person's teeth.

The yielding mounting of the bearings 25 are old in the art and are shown for the purpose of illustrating an operative machine.

Gears 30, 31 having relatively long intermeshing teeth are secured to the shafts 26 and 27 and the teeth are long so they can separate considerably without getting out of driving mesh to compensate for large and small date seeds. In other words when the crusher rollers are separated by very large date seeds, the gears will also separate some, but remain in a driving connection.

Also secured to the ends of the shaft 27 are oppositely arranged sprocket wheels 32, 33, the former being connected by a chain 34 to a sprocket wheel 35 on a cross shaft 36 in bearings 37. This shaft carries a feed roller 58 that has a convex groove in its periphery similar to the groove in the wheel 29 and coacts with it to feed the dates 39 downward in between and along the shredder rollers 16, 17 so the fruit can be stripped from the seeds 40.

The sprocket wheel 33 is connected by a chain 41 with a sprocket wheel 42 on the shaft 43 that is mounted in the bearings 44, see Fig. 2.

The shaft 43 has a bevel gear 45 on its inner end that meshes with the bevel gear 23 so that when the pulley 46 on the outer end of shaft 43 is driven, the gears, rollers and chain drives heretofore mentioned will be rotated.

Also mounted on the shaft 43 is a gear 47 that meshes with a gear 48 on the cross shaft 49 mounted in the bearings 50.

Centrally arranged on the shaft 49 is a lower pulley 51 that is aligned with the upper pulleys 52 and 53 mounted in the upper end of the main hopper 54; and extended over these pulleys is an endless belt 55 that has the spaced carriers 56 thereon. The carriers 56 are arranged to pick up individual dates 39 from the bottom 57 of the main hopper and first carry them vertically and then a short distance horizontally and drop them into the feed hopper 58 that is arranged over and slightly between the crusher rollers 28, 29.

The bearings 50 of the shaft 49 are provided with a belt tightening means, as semi-diagrammatically indicated at 59 in Figs. 1 and 6. As belt tighteners are old this mounting is not shown or described in detail, it being understood that the belt 55 is held sufficiently taut to move over the pulleys when the pulley 51 is driven.

The feed hopper 58 is provided with a gate 60 that is hinged at 61 and normally rests against the face of the crusher roller 28, but intermittently is raised out of engagement with the roller by a cam 62 on the rock arm 63. This arm is arranged so its lower end is engaged by the spaced pins 64 secured in a side of the roller 28. In other words, when the roller 28 is rotated the pins 64 will successively engage the arm and lift the gate 60 so as to agitate the dates in the hopper 58 to thereby help feed them to the crusher roller.

Stripping plates 65 are under the rollers 16 and 17 and are pivotally mounted on rods 66 secured to the frame; and springs 67 hold their sharp free edges engaged with the rollers to strip the fruit off as it is removed from the date seeds and the shredded fruit falls into a catch pan 68 arranged under the rollers.

The discharged ends of the rollers are reduced in size, at 69, so that the seeds 40 fall into the seed pan 70 at the discharge end of the shredder rollers.

In operation the pulley 46 is driven to actuate the moving parts as heretofore described, and then ripe dates are placed in the main hopper 54 and carried to the auxiliary hopper 58 by the belt 55 and carriers 56. The gate 60 is moved as described to help feed the dates 39 down by gravity between the crusher rollers 28, 29, where they are mashed out into semi-flattened forms that in shape are much like endless troughs.

And also these rollers in addition to crushing the dates feed them downward to the shredder rollers 16, 17 that immediately begin removing the fruit from the seeds and discharging it into the pan 86.

The rollers 29 and 38 aid the helical edges of the grooves 18 in carrying the dates toward the discharge ends of the shredder rollers and as they are moved along the fruit is fully stripped from the seeds.

While I have described this machine as specifically designed for removing the fruit from date seeds it is understood that it can be used for like purposes.

I claim as my invention:

1. A machine for shredding date fruit including two parallel shredding rollers spaced apart a distance for shredded fruit to pass between them but not for the date seeds to pass between the rollers, crusher rollers arranged over the space between the shredder rollers, and means for rotating all of said rollers so that they move in a timed relationship to one another for the purpose specified.

2. A machine for shredding date fruit including two parallel shredding rollers arranged to form a passage between them that is of less width than the cross diameter of the seeds of the dates to be shredded, crusher rollers arranged above said shredder rollers and over the passage between them, and means for rotating all of said rollers for the purpose of first crushing the dates and then stripping the fruit from the seeds.

3. A machine for shredding date fruit including a frame, two parallel shredding rollers rotatably mounted thereon and arranged with a longitudinal passage between them that is of less width than the cross diameter of the seeds of the dates to be shredded so the fruit without the seeds can pass between the rollers, helical grooves in the peripheral surfaces arranged to carry the date seeds from adjacent the feed to the discharge ends of said rollers; and means above said rollers for crushing the dates as they are fed to the rollers and forcing them downward into engagement with said rollers.

4. The combination set forth in claim 3 with, a main hopper for holding the dates, a feed hopper arranged above said rollers, means for conveying the dates from the main to the feed hopper, and means for driving said rollers and conveying the dates from the main to said feed hopper.

5. The combination set forth in claim 3 with, a main hopper for holding the dates, a feed hopper arranged above said rollers, means for conveying the dates from the main to the feed hopper, means for agitating the dates in the feed hopper so they will more readily fall by gravity to said crushing means, and means for driving said rollers and conveying means.

6. A machine for shredding date fruit including a frame, shredder rollers rotatably mounted thereon and arranged adjacent to one another to form a passage between them for the shredded date fruit, said passage being too narrow for the passage of the date seeds, helical grooves in each roller arranged to carry the date seeds longitudinally of said passage, and means for crushing the dates before they are engaged by said shredder rollers.

7. A machine for shredding date fruit including a frame, shredder rollers rotatably mounted thereon and arranged parallel and adjacent to one another to form a narrow passage between them, helical grooves in each of said rollers arranged to move the seeds of the dates longitudinally of said passage, crusher rollers rotatably mounted on said shredder frame arranged above said shredder rollers and over said passage adjacent the feed ends of said shredder rollers, and means for driving said rollers.

8. The combination set forth in claim 7, with a feed hopper arranged over said crusher rollers, and means for conveying dates to said hopper.

9. The combination set forth in claim 7, with, a main hopper for holding dates, a feed hopper arranged over said crusher rollers, and a conveyor for moving the dates from said main to said feed hopper.

10. A machine for shredding date fruit including a frame, shredder rollers rotatably mounted thereon and arranged lengthwise of said frame and adjacent to one another to form a passage between them, shafts arranged crosswise of and rotatably mounted on said frame above said shredder rollers, crusher rollers secured to two of said shafts and arranged with their peripheries normally in contact, means for yieldingly mounting one of said shafts so its crusher roller can move out of contact with the other crusher roller, and means for driving all of said rollers.

11. The combination set forth in claim 10 with a main hopper on said frame, a feed hopper above said crusher rollers, and a conveyor actuated by said driving means for carrying dates from the main to the feed hopper.

12. The combination set forth in claim 10 with, a main hopper on said frame, a feed hopper above said crusher rollers, a hinged gate to said feed hopper, a conveyor actuated by said driving means for carrying dates from the main to said feed hopper, and a cam actuated by one of said crusher rollers for moving said gate for the purpose specified.

13. A machine for shredding date fruit including a frame, two shredder rollers rotatably mounted thereon and arranged lengthwise of said frame and adjacent to one another to form a passage between them, helical grooves extending from the feed to the discharge ends of said rollers, three shafts arranged crosswise and rotatably mounted on said frame above said rollers, a crusher roller secured to one of said shafts that has a concave periphery, another crusher roller on another cross shaft that has a convex periphery normally engaged with the concave periphery of the first mentioned crusher roller, means whereby the crusher roller with the convex periphery can move out of engagement with the other crusher roller, a feed roller secured to the third shaft that is arranged over and close to the passage between said shredder rollers, and means for driving all of said rollers.

14. The combination set forth in claim 13 with, a main hopper on said frame, a feed hopper above said crusher rollers, and a conveyor actuated by said driving means for carrying the date from the main to said feed hopper.

15. The combination set forth in claim 13 with, a main hopper on said frame, a feed hopper above said crusher rollers, a hinged gate to said feed hopper, a conveyor actuated by said driving means for carrying dates from the main to said feed hopper, and a cam actuated by one of said crusher rollers for moving said gate for the purpose specified.

In witness whereof, I have hereunto affixed my signature.

JAMES H. NORTHROP.